United States Patent
Wu et al.

(10) Patent No.: US 11,300,218 B2
(45) Date of Patent: Apr. 12, 2022

(54) THREE-WAY FLOW DIVIDING VALVE STRUCTURE

(71) Applicant: Purity (Xiamen) Sanitary Ware Co., Ltd., Xiamen (CN)

(72) Inventors: James Wu, Taichung (TW); Alex Wu, Taichung (TW); Ce-Wen Yang, Xiamen (CN); Shou-Qiang Zhang, Xiamen (CN); Xing-Chuang Ling, Xiamen (CN); Guo-Zhong Wu, Xiamen (CN)

(73) Assignee: PURITY (XIAMEN) SANITARY WARE CO., LTD., Xiamen (CN)

(*) Notice: Subject to any disclaimer, the term of this patent is extended or adjusted under 35 U.S.C. 154(b) by 151 days.

(21) Appl. No.: 16/748,427

(22) Filed: Jan. 21, 2020

(65) Prior Publication Data

US 2021/0222780 A1 Jul. 22, 2021

(51) Int. Cl.
*F16K 11/085* (2006.01)
*F16K 31/60* (2006.01)
*F16K 5/04* (2006.01)

(52) U.S. Cl.
CPC ........ *F16K 11/0856* (2013.01); *F16K 5/0442* (2013.01); *F16K 31/602* (2013.01)

(58) Field of Classification Search
USPC ...... 137/311, 625.19, 876, 862, 883, 625.46, 137/625.47
See application file for complete search history.

(56) References Cited

U.S. PATENT DOCUMENTS

| | | | | |
|---|---|---|---|---|
| 1,038,515 A | * | 9/1912 | Aydelott | B61C 15/102 137/345 |
| 6,186,174 B1 | * | 2/2001 | Yurchision | F16K 3/10 137/625.46 |
| 10,641,400 B2 | * | 5/2020 | Gong | E03C 1/02 |
| 2006/0070671 A1 | * | 4/2006 | Kasai | F16K 11/0743 137/625.46 |
| 2009/0277522 A1 | * | 11/2009 | Huang | E03C 1/0408 137/876 |
| 2013/0126645 A1 | * | 5/2013 | Zhou | B05B 1/18 239/581.1 |

* cited by examiner

*Primary Examiner* — Daphne M Barry
(74) *Attorney, Agent, or Firm* — Birch, Stewart, Kolasch & Birch, LLP (57) ABSTRACT

A three-way flow dividing valve structure is provided, including a valve body, a water divider, a spring, and a switch handle. A water intake communicating with the water inlet is formed on the side wall of the flow dividing chamber. A first and second outlet holes respectively communicating with the water outlets are formed at the bottom of the flow dividing chamber. The water divider includes a water dividing shaft and a water dividing dish; the bottom of the water dividing shaft is connected to the water dividing dish in the flow dividing chamber. The water dividing dish has a water dividing hole movably communicating with the outlet holes. The top of the water dividing shaft protrudes from the valve body and is connected to the switch handle. Two ends of the spring abut against the water dividing dish and the bonnet respectively. The present disclosure can be operated effortlessly.

14 Claims, 8 Drawing Sheets

THREE-WAY FLOW DIVIDING VALVE STRUCTURE

BACKGROUND OF THE INVENTION

1. Technical Field

The present invention relates generally to waterway switch, and more particularly to a three-way flow dividing valve structure.

2. Description of Related Art

Generally, the existing water diversion valve has a water inlet and a plurality of water outlets on the side wall of a water separation cavity. A switch handle drives a valve shaft to rotate so that a gasket provided on the side wall of the valve shaft can movably seal the water inlet and the water outlets, and thus the water flow can be divided. To ensure the gasket can tightly seal the water inlet and the water outlets, there will be a spring between the gasket and the valve shaft. In addition, there are two sealing rings between the valve shaft and the side wall of the flow dividing chamber, which are respectively located on the upper and lower sides of the gasket to prevent water leak. However, during the switch handle drives the valve shaft to rotate, the abovementioned components cause large rotation friction of the valve shaft, which makes the operation of the water diversion valve laborious. Furthermore, the valve shaft may deviate from its axis during rotating because of being forced unevenly.

BRIEF SUMMARY OF THE INVENTION

In view of the above, the primary objective of the present invention is to provide a three-way flow dividing valve structure, which can be easily operated.

The present invention provides a three-way flow dividing valve structure including a valve body, a water divider, a spring, and a switch handle. The valve body includes a valve seat and a bonnet; the valve seat has a water inlet, a first water outlet, and a second water outlet on a side face thereof. The interior of the valve seat forms a flow dividing chamber which has a top opening. A water intake communicating with the water inlet is formed on a side wall of the flow dividing chamber, while a first outlet hole and a second outlet hole which respectively communicate with the first water outlet and the second water outlet are formed at a bottom of the flow dividing chamber. The bonnet is installed on the top opening of the flow dividing chamber, and has a perforation. The water divider includes a water dividing shaft and a water dividing dish. A bottom end of the water dividing shaft is connected to and coaxial with the water dividing dish. The water dividing dish is located in the flow dividing chamber, and abuts against the bottom of the flow dividing chamber. The water dividing dish has a water dividing hole, which movably communicates with the first outlet hole and the second outlet hole. A top end of the water dividing shaft passes through the perforation of the bonnet, protrudes from the flow dividing chamber, and is connected to the switch handle. The water dividing shaft and the perforation are tightly closed to each other. The spring is located in the flow dividing chamber, wherein a top and a bottom ends of the spring abut against the water dividing dish and the bonnet respectively.

A gasket is provided between a bottom surface of the water dividing dish and the bottom of the flow dividing chamber. The gasket has two through holes which are respectively aligned with the first outlet hole and the second outlet hole.

An embedding recess is provided at the bottom of the flow dividing chamber for the gasket which is embedded in the embedding recess.

The first outlet hole and the second outlet hole are axisymmetric. The number of the water dividing holes is three which are arranged on a circle; each of the water dividing holes has a symmetrically curved shape, and has an axis of symmetry. The angles between the axis of symmetry of the water dividing hole which is in the middle among the three water dividing holes and the symmetry axes of the other two water dividing holes are both 90 degrees; a center of the circle is coaxial with a central axis of the water dividing shaft.

The bonnet has three positioning grooves on a top thereof; the three positioning grooves are arranged on another circle. A connecting line between the positioning groove which is in the middle among the three positioning grooves and a center of the another circle is defined as a first connecting line, while two connecting lines between the center of the another circle and the other two positioning grooves are respectively defined as a second connecting line and a third connecting line. The angle between the first connecting line and the second connecting line, as well as the angle between the first connecting line and the third connecting line, are both 90 degrees. The center of the another circle is coaxial with the central axis of the water dividing shaft. The switch handle is connected to an elastic positioning pin which is movably fitted in the positioning grooves.

A guide pillar is provided at a center of the bottom of the flow dividing chamber, and the guide pillar is protruding upward. The water dividing dish has a guide groove at a center of a bottom thereof to be passed through by the guide pillar.

A sealing ring is provided between the water dividing shaft and the perforation.

The effect of the present invention is that the rotation friction of the water divider is reduced so that the flow dividing valve can be operated effortlessly.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

As shown in FIG. 1 to FIG. 8, the first preferred embodiment of the present invention, a three-way flow dividing valve structure, includes a valve body 1, a water divider 2, a spring 4, and a switch handle 5. The valve body 1 includes a valve seat 11 and a bonnet 12, wherein the valve seat 11 has a water inlet 111, a first water outlet 112, and a second water outlet 113 on the side face thereof. Moreover, the valve seat 1 forms a flow dividing chamber 10 which has a top opening 110, wherein a water intake 101 communicating with the water inlet 111 forms on the side wall of the flow dividing chamber 10; a first outlet hole 102 and a second outlet hole 103 form at the bottom of the flow dividing chamber 10, wherein the first outlet hole 102 and the second outlet hole 103 communicate with the first water outlet 112 and the second water outlet 113 respectively. The bonnet 12 is installed on the top opening 110 of the flow dividing chamber 10, and has a perforation 121. The bonnet 12 is installed on the top opening 110 of the flow dividing chamber 10 by mortise-and-tenon joint or screw lock. Furthermore, a gland ring a is provided between the bonnet 12 and the top opening 110 of the flow dividing chamber 10 so as to ensure water tightness. The water divider 2 includes a water dividing shaft 21 and a water dividing dish 22, which are coaxial, and the bottom end of the water dividing shaft 21 is connected to the water dividing dish 22. The water dividing dish 22 is located in the flow dividing chamber 10, and abuts against the bottom end of the flow dividing chamber 10. The water dividing dish 22 has water dividing holes 221 which movably communicate with the first outlet hole 102 and the second outlet hole 103. The top end of the water dividing shaft 21 passes through the perforation 121 of the bonnet 12 and the flow dividing chamber 10, and is connected to the switch handle 5. A sealing ring b is provided between the water dividing shaft 21 and the perforation 121 so that the water dividing shaft 21 and the bonnet 12 are tightly connected, which also ensures water tightness. The spring 4 is located in the flow dividing chamber 10; the top and the bottom ends of the spring 4 abut against the water dividing dish 22 and the bonnet 12 respectively so that the water dividing dish 22 abut against the bottom of the flow dividing chamber 10 tightly. The switch handle 5 drives the water divider 2 to rotate so as to control the connection state of the water dividing holes 221 and the first outlet hole 102 as well as the second outlet hole 103, and thus to switch the waterway. Compared to the prior art, there is no sealing component between the water divider 2 and the side wall of the flow dividing chamber 101 in the present disclosure, which reduces the rotation friction of the water divider, so that the present disclosure can be easily operated. In addition, the water divider 2 is forced evenly during rotating, which prevents the water divider 2 from deviating from its axis.

Specifically, as shown in FIG. 1, FIG. 2, FIG. 3, and FIG. 6 to FIG. 8, the first outlet hole 102 and the second outlet hole 103 are axisymmetric. The number of the water dividing holes 221 of the water dividing dish 22 can be three, which are arranged on a circle; each water dividing hole 221 has a symmetrically curved shape, and has an axis of symmetry. The angles between the axis of symmetry of the middle water dividing hole 221 and the symmetry axes of the other two water dividing holes 221 are both 90 degrees. The center of the circle is coaxial with the central axis of the water dividing shaft 21. Therefore, the water divider 2 can switch the waterway by every 90-degrees rotation. More specifically, when the water divider 2 is turned to the state illustrated in FIG. 6, that is, when one of the water dividing holes 221 of the water dividing dish 22 is aligned with the first outlet hole 102 while the remaining two water dividing holes 221 are not aligned with the second outlet hole 103, the water intake 101 only communicates with the first outlet hole 102, so that water flows out from the first water outlet 112. On the other hand, when the water divider 2 is turned to the state shown in FIG. 7, that is, when two of the water dividing holes 221 of the water dividing dish 22 are respectively aligned with the water intake 101 and the second outlet hole 103 while the remaining one water dividing hole 221 is not aligned with the first outlet hole 102, the water intake 101 only communicates with the second outlet hole 103, so that water flows out from the second water outlet 113. Besides, when the water divider 2 is turned to the state shown in FIG. 8, that is to say, when two of the water dividing holes 221 of the water dividing dish 22 are respectively aligned with the first outlet hole 102 as well as the second outlet hole 103, the water intake 101 communicates with both the first outlet hole 102 and the second outlet hole 103, so that water flows out from the first water outlet 112 and the second water outlet 113. However, when the water divider 2 is turned to the state that all of the water dividing holes 221 of the water dividing dish 22 are not aligned with the water intake 101, the first outlet hole 102, and the second outlet hole 103, the water intake 101 doesn't communicate with the first outlet hole 102 and the second outlet hole 103, so that water will not flow through the first water outlet 112 and the second water outlet 113, that is, the waterways are closed.

Figure 1:
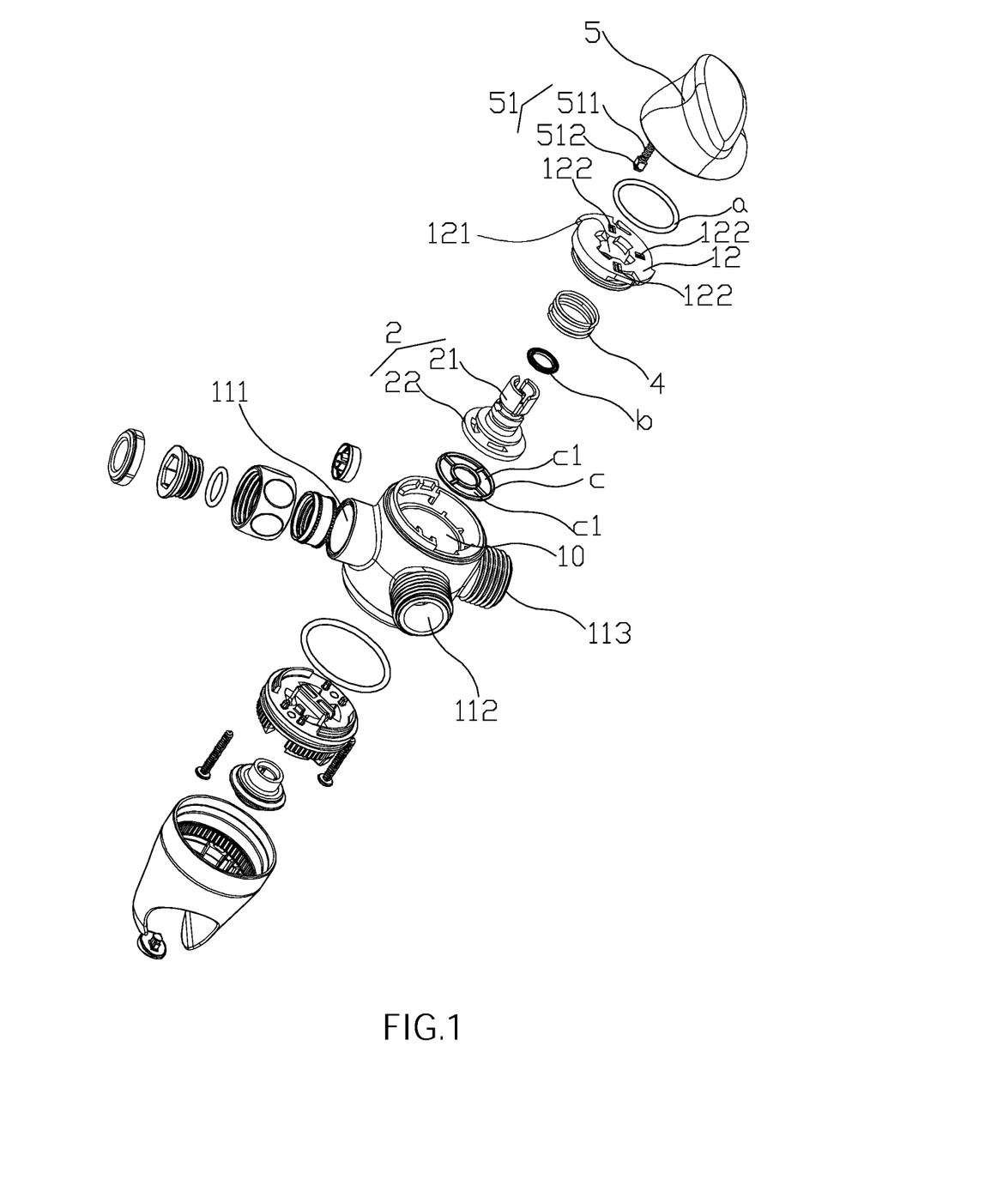
FIG. 1 is an exploded view of the first preferred embodiment of the present invention.
Figure 5:
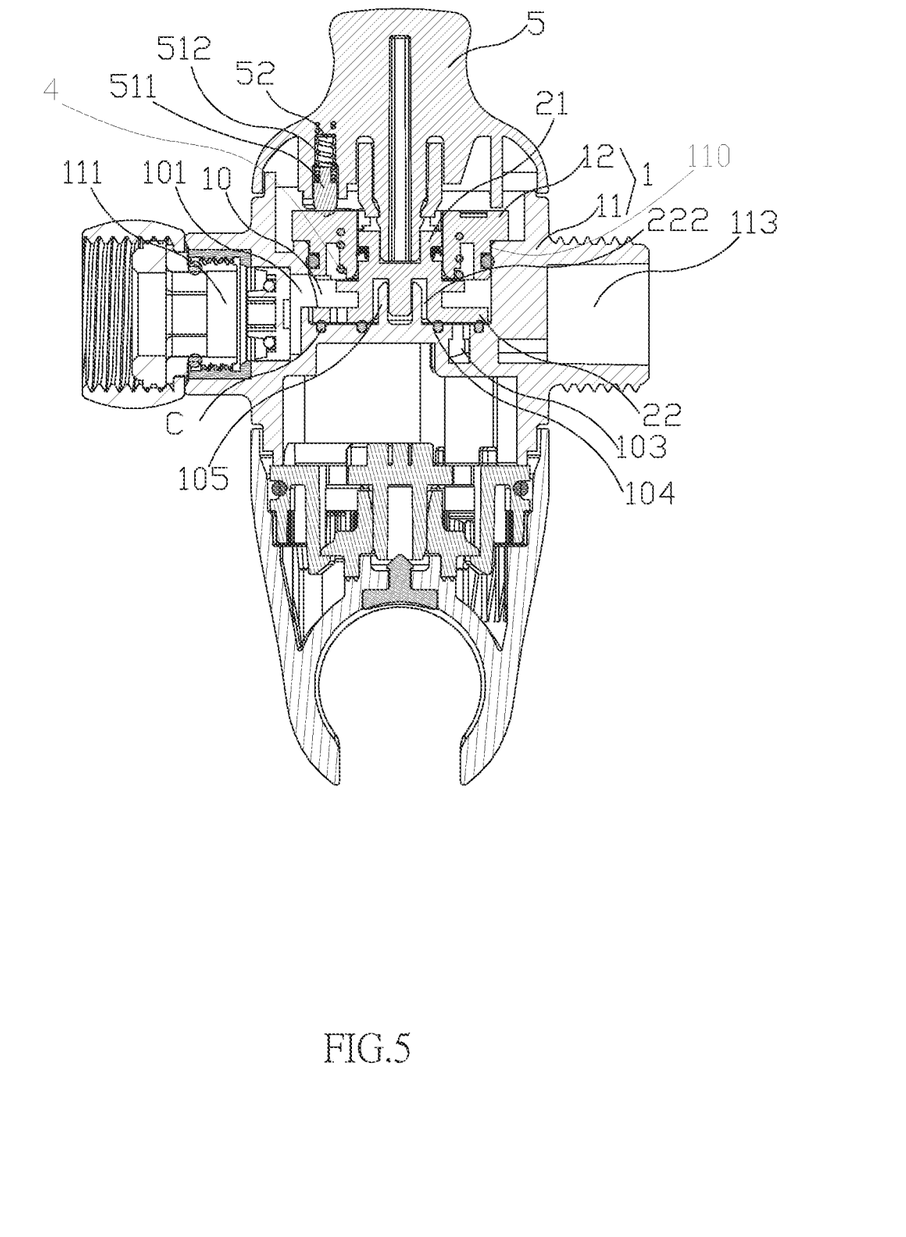
FIG. 5 is a first sectional view of the first preferred embodiment.
Figure 6:
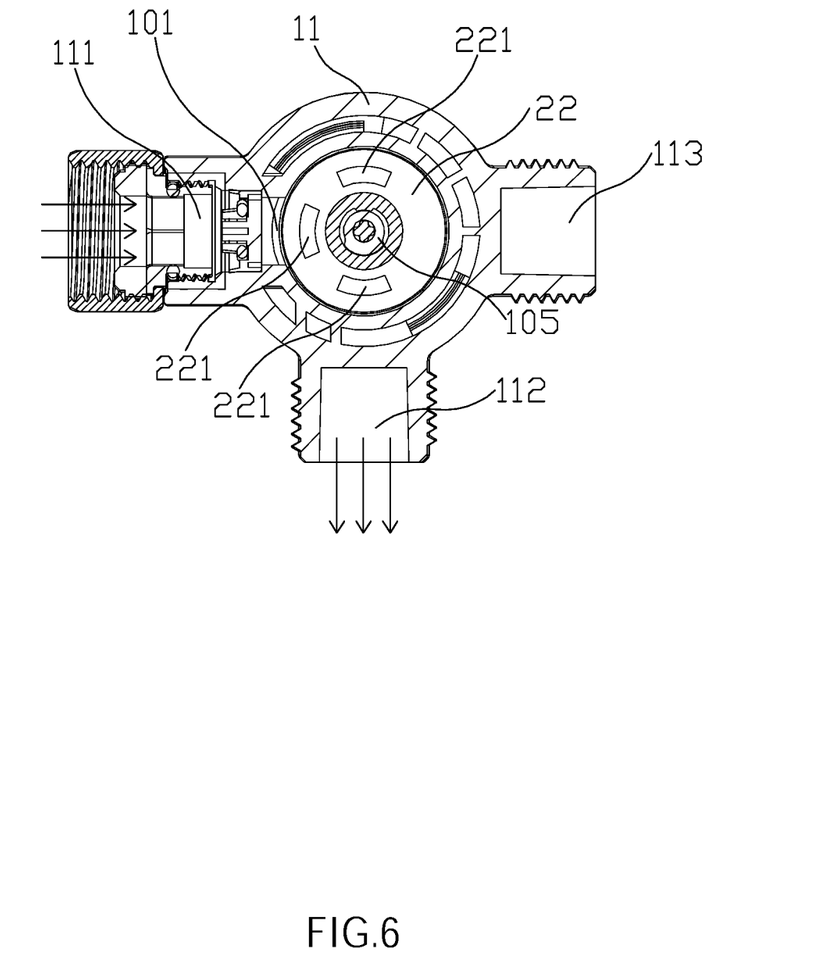
FIG. 6 is a second sectional view of the first preferred embodiment.
Figure 7:
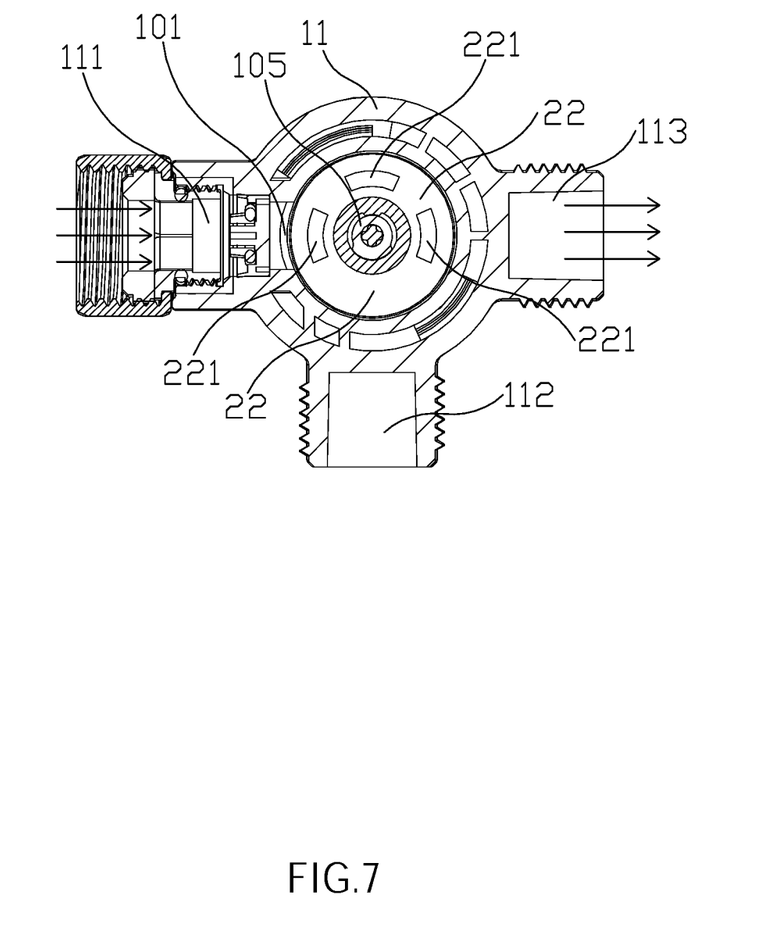
FIG. 7 is a third sectional view of the first preferred embodiment.
Figure 8:
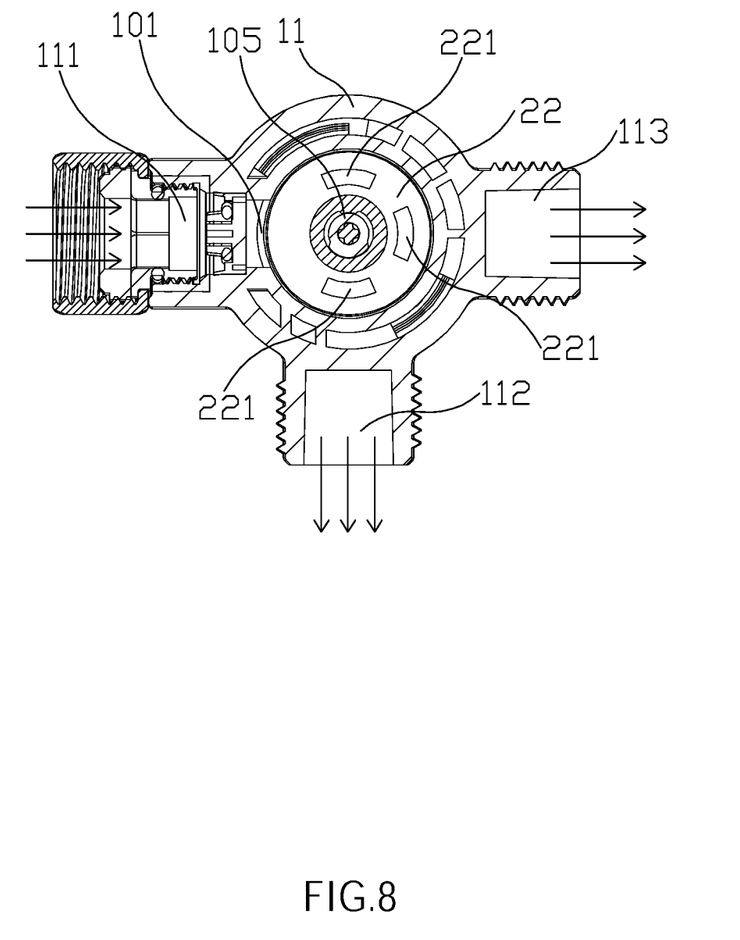
FIG. 8 is a fourth sectional view of the first preferred embodiment.

As shown in FIG. 1 and FIG. 5, the bonnet 12 has three positioning grooves 122 on the top thereof, wherein the three positioning grooves 122 are arranged on a circle; a connecting line between the middle positioning groove 122 and the center of the circle is defined as a first connecting line, and two connecting lines between the center of the circle and the other two positioning grooves 122 are respectively defined as a second connecting line and a third connecting line. The angle between the first connecting line and the second connecting line, as well as the angle between the first connecting line and the third connecting line, are both 90 degrees. Moreover, the center of the circle where the three positioning grooves 122 are arranged on is coaxial with the central axis of the water dividing shaft 21. The switch handle 5 is connected to an elastic positioning pin 51 which is movably fitted in the positioning groove 122, so that there will be three water outlet states which can be switched by changing the fitting state of the positioning pin 51 and the three positioning grooves 122. That is, the different fitting states of the positioning pin 51 and the three positioning grooves 122 form three gears for waterway switch, which is convenient for users. Furthermore, the positioning pin 51 includes a pin head 511 and a positioning pin spring 512. The switch handle 5 has a pin hole 52 with a downward opening, and the pin head 511 and the positioning pin spring 512 are fitted in the pin hole 52. The top and the bottom end of the positioning pin spring 512 respectively abut against the top of the pin hole 52 and the pin head 511. The bottom end of the pin head 511 is movably fitted in and joined to the positioning grooves 122.

Figure 2:
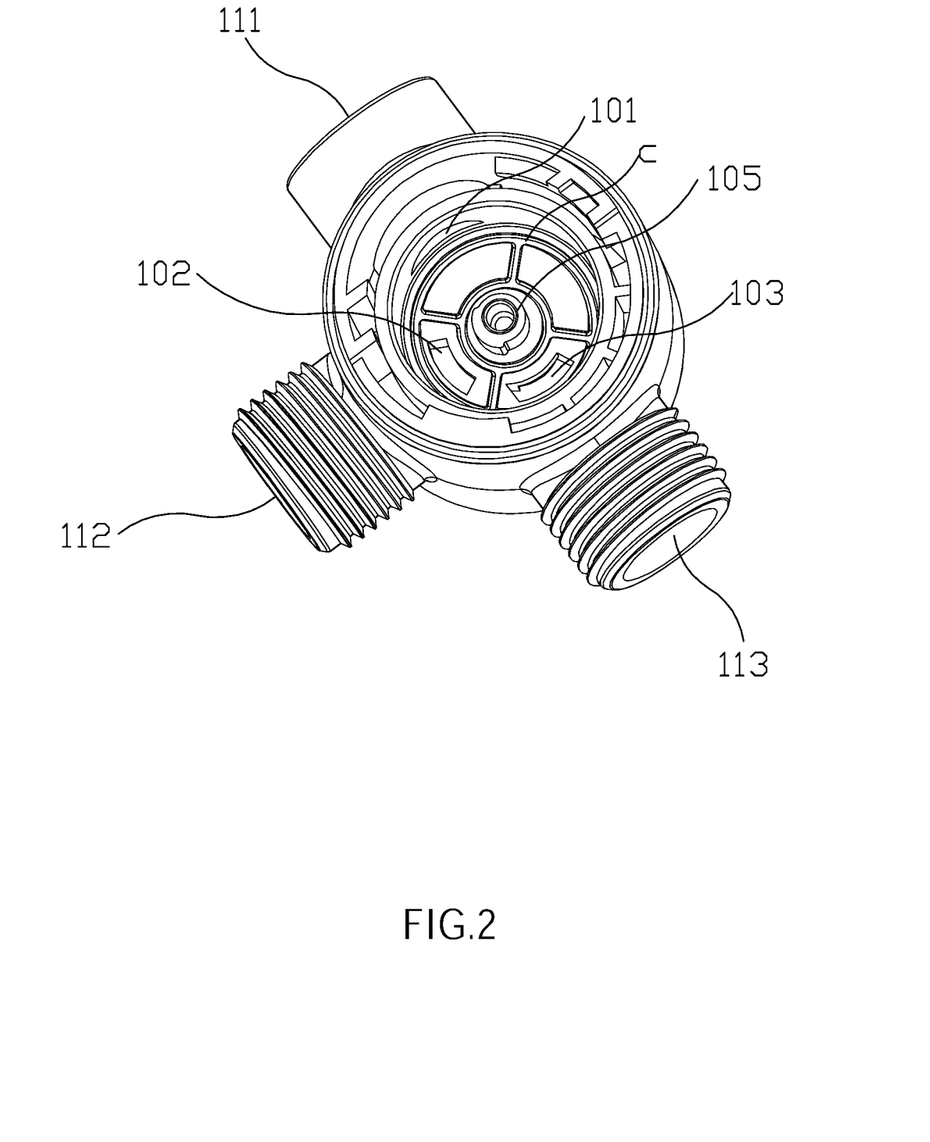
FIG. 2 is a perspective view of the valve seat in FIG. 1.
Figure 3:
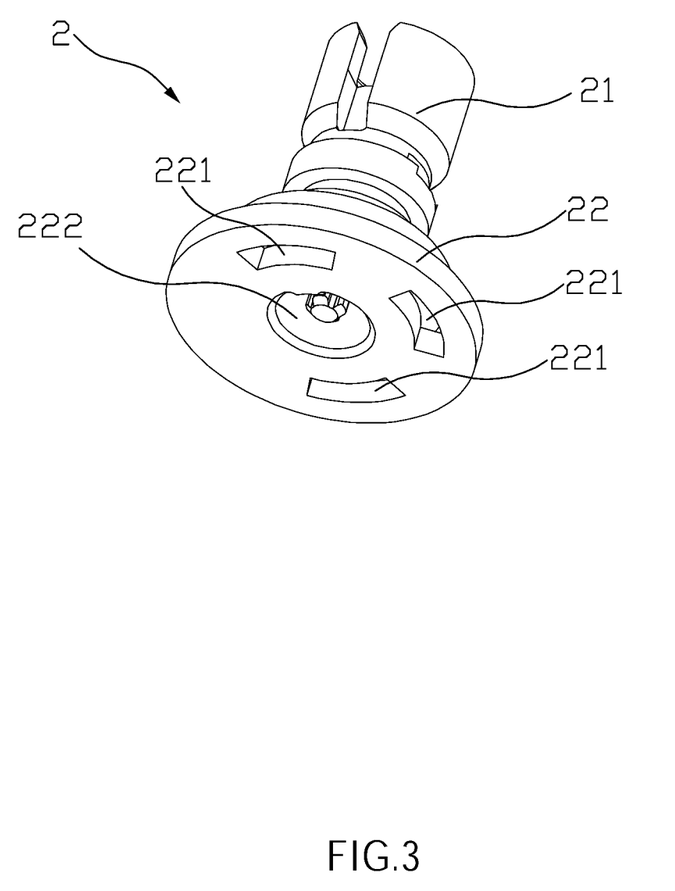
FIG. 3 is a perspective view of the water divider in FIG. 1.
Figure 4:
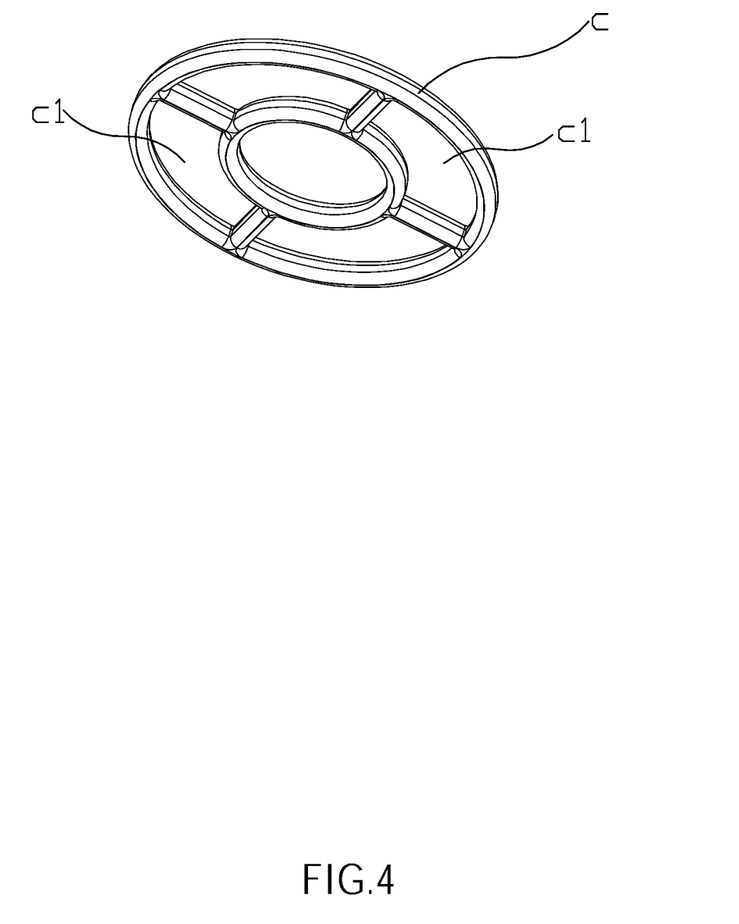
FIG. 4 is a perspective view of the gasket in FIG. 1.

Referring to GIF. 1, FIG. 2, FIG. 4 and FIG. 5, a gasket c is provided between the bottom side of the water dividing dish 22 and the bottom of the flow dividing chamber 10, wherein the gasket c has two through holes c1 which are respectively aligned with the first outlet hole 102 and the second outlet hole 103, so that each waterway is independent through the gasket c. As shown in FIG. 5, an embedding recess 104 is provided at the bottom of the flow dividing chamber 10 for the gasket c; the gasket c is embedded in the embedding recess 104 to prevent the gasket c from shifting. Additionally, a guide pillar 105 is provided at the center of the bottom of the flow dividing chamber 10, wherein the guide pillar 105 is protruding upward. The water dividing dish 22 has a guide groove 222 at the center of the bottom thereof to be passed through by the guide pillar 105. Thus, the water dividing dish 22 will not shift by the fitting of the guide pillar 105 and the guide groove 222.

The embodiments described above are only preferred embodiments of the present invention. All equivalent structures which employ the concepts disclosed in this specification and the appended claims should fall within the scope of the present invention.

What is claimed is:

1. A three-way flow dividing valve structure characterized by a valve body, a water divider, a spring, and a switch handle, wherein:

the valve body comprises a valve seat and a bonnet; the valve seat has a water inlet, a first water outlet, and a second water outlet on a side face thereof; an interior of the valve seat forms a flow dividing chamber which has a top opening; a water intake communicating with the water inlet is formed on a side wall of the valve seat, while a first outlet hole and a second outlet hole which respectively communicate with the first water outlet and the second water outlet are formed at a bottom of the valve seat; the bonnet is installed on the top opening of the flow dividing chamber, and has a perforation; and the water divider comprises a water dividing shaft and a water dividing dish; a bottom end of the water dividing shaft is connected to and coaxial with the water dividing dish; the water dividing dish is located in the flow dividing chamber, and abuts against the bottom of the flow dividing chamber; the water dividing dish has a water dividing hole, which movably communicates with the first outlet hole and the second outlet hole; a top end of the water dividing shaft passes through the perforation of the bonnet, protrudes from the flow dividing chamber, and is connected to the switch handle; the water dividing shaft and the perforation are tightly closed to each other; the spring is located in the flow dividing chamber, wherein a top and a bottom ends of the spring abut against the water dividing dish and the bonnet respectively.

2. The three-way flow dividing valve structure of claim 1, wherein a gasket is provided between a bottom surface of the water dividing dish and the bottom of the flow dividing chamber; the gasket has two through holes which are respectively aligned with the first outlet hole and the second outlet hole.

3. The three-way flow dividing valve structure of claim 2, wherein an embedding recess is provided at the bottom of the flow dividing chamber for the gasket which is embedded in the embedding recess.

4. The three-way flow dividing valve structure of claim 1, wherein the first outlet hole and the second outlet hole are axisymmetric; the number of the water dividing holes is three which are arranged on a circle; each of the water dividing holes has a symmetrically curved shape, and has an axis of symmetry; angles between the axis of symmetry of the water dividing hole which is in the middle among the three water dividing holes and the symmetry axes of the other two water dividing holes are both 90 degrees; a center of the circle is coaxial with a central axis of the water dividing shaft.

5. The three-way flow dividing valve structure of claim 4, wherein the bonnet has three positioning grooves on a top thereof; the three positioning grooves are arranged on another circle; a connecting line between the positioning groove which is in the middle among the three positioning grooves and a center of the another circle is defined as a first connecting line, while two connecting lines between the center of the another circle and the other two positioning grooves are respectively defined as a second connecting line and a third connecting line; an angle between the first connecting line and the second connecting line, as well as an angle between the first connecting line and the third connecting line, are both 90 degrees; the center of the another circle is coaxial with the central axis of the water dividing shaft; the switch handle is connected to an elastic positioning pin which is movably fitted in the positioning grooves.

6. The three-way flow dividing valve structure of claim 1, wherein a guide pillar is provided at a center of the bottom of the flow dividing chamber, and the guide pillar is protruding upward; the water dividing dish has a guide groove at a center of a bottom thereof to be passed through by the guide pillar.

7. The three-way flow dividing valve structure of claim 1, wherein a sealing ring is provided between the water dividing shaft and the perforation.

8. A three-way flow dividing valve structure characterized by a valve body, a water divider, a spring, and a switch handle, wherein:

the valve body comprises a valve seat and a bonnet; the valve seat has a water inlet, a first water outlet, and a second water outlet on a side face thereof; an interior of the valve seat forms a flow dividing chamber which has a top opening; a water intake communicating with the water inlet is formed on a side wall of the valve seat, while a first outlet hole and a second outlet hole which respectively communicate with the first water outlet and the second water outlet are formed at a bottom of the valve seat; the bonnet is installed on the top opening of the flow dividing chamber, and has a perforation; and the water divider comprises a water dividing shaft and a water dividing dish; a bottom end of the water dividing shaft is connected to and coaxial with the water dividing dish; the water dividing dish is located in the flow dividing chamber, and abuts against the bottom of the flow dividing chamber; the water dividing dish has a water dividing hole, which movably communicates with the first outlet hole and the second outlet hole; a top end of the water dividing shaft passes through the perforation of the bonnet, protrudes from the flow dividing chamber, and is connected to the switch handle; the water dividing shaft and the perforation are tightly closed to each other; the spring is located in the flow dividing chamber, wherein a top and a bottom ends of the spring abut against the water dividing dish and the bonnet respectively;

wherein the water dividing dish of the water divider is abutted against by both of the valve seat and the bonnet, and the bonnet directly abuts against the water dividing dish.

9. The three-way flow dividing valve structure of claim 8, wherein a gasket is provided between a bottom surface of the water dividing dish and the bottom of the flow dividing chamber; the gasket has two through holes which are respectively aligned with the first outlet hole and the second outlet hole.

10. The three-way flow dividing valve structure of claim 9, wherein an embedding recess is provided at the bottom of the flow dividing chamber for the gasket which is embedded in the embedding recess.

11. The three-way flow dividing valve structure of claim 8, wherein the first outlet hole and the second outlet hole are axisymmetric; the number of the water dividing holes is three which are arranged on a circle; each of the water dividing holes has a symmetrically curved shape, and has an axis of symmetry; angles between the axis of symmetry of the water dividing hole which is in the middle among the three water dividing holes and the symmetry axes of the other two water dividing holes are both 90 degrees; a center of the circle is coaxial with a central axis of the water dividing shaft.

12. The three-way flow dividing valve structure of claim 11, wherein the bonnet has three positioning grooves on a top thereof; the three positioning grooves are arranged on another circle; a connecting line between the positioning groove which is in the middle among the three positioning grooves and a center of the another circle is defined as a first connecting line, while two connecting lines between the center of the another circle and the other two positioning grooves are respectively defined as a second connecting line and a third connecting line; an angle between the first connecting line and the second connecting line, as well as an angle between the first connecting line and the third connecting line, are both 90 degrees; the center of the another circle is coaxial with the central axis of the water dividing shaft; the switch handle is connected to an elastic positioning pin which is movably fitted in the positioning grooves.

13. The three-way flow dividing valve structure of claim 8, wherein a guide pillar is provided at a center of the bottom of the flow dividing chamber, and the guide pillar is protruding upward; the water dividing dish has a guide groove at a center of a bottom thereof to be passed through by the guide pillar.

14. The three-way flow dividing valve structure of claim 8, wherein a sealing ring is provided between the water dividing shaft and the perforation.

* * * * *